(12) United States Patent
Cho

(10) Patent No.: US 12,263,803 B2
(45) Date of Patent: Apr. 1, 2025

(54) AIRBAG DEVICE FOR VEHICLE

(71) Applicant: HYUNDAI MOBIS CO., LTD., Seoul (KR)

(72) Inventor: Kwang Soo Cho, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/364,609

(22) Filed: Aug. 3, 2023

(65) Prior Publication Data

US 2024/0208453 A1 Jun. 27, 2024

(30) Foreign Application Priority Data

Dec. 27, 2022 (KR) .......................... 10-2022-0185181

(51) Int. Cl.
*B60R 21/239* (2006.01)
*B60R 21/2338* (2011.01)

(52) U.S. Cl.
CPC ........ *B60R 21/239* (2013.01); *B60R 21/2338* (2013.01)

(58) Field of Classification Search
CPC .......... B60R 2021/2612; B60R 21/261; B60R 2021/2395; B60R 2021/23382; B60R 21/2338; B60R 21/239
See application file for complete search history.

(56) References Cited

U.S. PATENT DOCUMENTS

| | | | | |
|---|---|---|---|---|
| 3,451,693 A * | 6/1969 | Carey | ................... | B60R 21/239 280/739 |
| 7,347,450 B2 * | 3/2008 | Williams | .............. | B60R 21/239 280/739 |
| 7,556,290 B2 * | 7/2009 | Williams | .............. | B60R 21/239 280/743.1 |
| 7,614,653 B2 * | 11/2009 | Rose | ................... | B60R 21/2338 280/739 |
| 7,658,407 B2 * | 2/2010 | Ford | ..................... | B60R 21/239 280/739 |
| 7,770,926 B2 * | 8/2010 | Schneider | ............. | B60R 21/239 280/739 |
| 7,938,445 B2 * | 5/2011 | Smith | ................... | B60R 21/239 280/743.2 |
| 7,959,184 B2 * | 6/2011 | Fukawatase | .......... | B60R 21/239 280/739 |

(Continued)

FOREIGN PATENT DOCUMENTS

KR    20120036640 A  *  4/2012
KR    20180055149 A  *  5/2018

(Continued)

*Primary Examiner* — Faye M Fleming
*Assistant Examiner* — Maxwell L Meshaka
(74) *Attorney, Agent, or Firm* — NovoTechIP International PLLC

(57) ABSTRACT

A vehicle airbag device according to an embodiment of the present invention may include a cushion which includes a chamber inflated by gas and in which vent holes are formed in both side surfaces of the cushion, a vent tube which is disposed in the chamber, into which the gas is introduced, and which is connected to the pair of vent holes to connect the pair of vent holes to each other and guides the introduced gas toward the vent holes, and a tether which is disposed in the chamber and tightens and closes the vent tube as the cushion inflates.

12 Claims, 7 Drawing Sheets

(56) References Cited

U.S. PATENT DOCUMENTS

| | | | | |
|---|---|---|---|---|
| 8,061,734 B2* | 11/2011 | Parks | ............... | B60R 21/239 |
| | | | | 280/739 |
| 8,191,925 B2* | 6/2012 | Williams | ........... | B60R 21/2338 |
| | | | | 280/739 |
| 8,251,398 B2* | 8/2012 | Parks | ............... | B60R 21/2346 |
| | | | | 280/739 |
| 8,419,056 B2* | 4/2013 | Parks | ............... | B60R 21/2346 |
| | | | | 280/739 |
| 8,500,165 B2* | 8/2013 | Kwon | ............... | B60R 21/239 |
| | | | | 280/739 |
| 8,651,523 B2* | 2/2014 | Miyata | ............... | B60R 21/205 |
| | | | | 280/743.1 |
| 9,511,737 B2* | 12/2016 | Cho | ............... | B60R 21/2171 |
| 9,731,678 B2* | 8/2017 | Kim | ............... | B60R 21/231 |
| 9,845,069 B1* | 12/2017 | Owen | ............... | B60R 21/205 |
| 10,029,646 B2* | 7/2018 | Kwon | ............... | B60R 21/205 |
| 11,001,007 B2* | 5/2021 | Albiez | ............... | B29B 13/025 |
| 11,091,111 B2* | 8/2021 | Deng | ............... | B60R 21/013 |
| 11,220,233 B2* | 1/2022 | Cho | ............... | B60R 21/235 |
| 11,230,253 B2* | 1/2022 | Hellot | ............... | B60R 21/219 |
| 11,814,005 B2* | 11/2023 | Cho | ............... | B60R 21/233 |
| 11,814,007 B1* | 11/2023 | Shin | ............... | B60R 21/207 |
| 11,858,455 B2* | 1/2024 | Jang | ............... | B60R 21/276 |
| 11,897,412 B2* | 2/2024 | Cho | ............... | B60R 21/2338 |
| 2006/0071461 A1* | 4/2006 | Williams | ........... | B60R 21/2338 |
| | | | | 280/739 |
| 2007/0126218 A1* | 6/2007 | Schnieder | ........... | B60R 21/2338 |
| | | | | 280/739 |
| 2008/0018086 A1* | 1/2008 | Ford | ............... | B60R 21/2338 |
| | | | | 280/739 |
| 2008/0073890 A1* | 3/2008 | Williams | ........... | B60R 21/2338 |
| | | | | 280/739 |
| 2008/0073891 A1* | 3/2008 | Rose | ............... | B60R 21/2338 |
| | | | | 280/739 |
| 2009/0039630 A1* | 2/2009 | Schneider | ........... | B60R 21/2346 |
| | | | | 280/739 |
| 2010/0225095 A1* | 9/2010 | Smith | ............... | B60R 21/239 |
| | | | | 280/743.2 |
| 2013/0056967 A1* | 3/2013 | Miyata | ............... | B60R 21/205 |
| | | | | 280/743.1 |
| 2013/0076012 A1* | 3/2013 | Wook/Kwon | ........ | B60R 21/239 |
| | | | | 280/740 |
| 2016/0144819 A1* | 5/2016 | Cho | ............... | B60R 21/232 |
| | | | | 280/730.2 |
| 2017/0129445 A1* | 5/2017 | Kim | ............... | B60R 21/231 |
| 2017/0349134 A1* | 12/2017 | Kwon | ............... | B60R 21/239 |
| 2020/0070428 A1* | 3/2020 | Albiez | ............... | B29D 23/003 |
| 2020/0384942 A1* | 12/2020 | Cho | ............... | B60R 21/235 |
| 2021/0094499 A1* | 4/2021 | Deng | ............... | B60R 21/261 |
| 2021/0138997 A1* | 5/2021 | Jang | ............... | B60R 21/276 |
| 2021/0179006 A1* | 6/2021 | Hellot | ............... | B60R 21/233 |
| 2022/0388470 A1* | 12/2022 | Cho | ............... | B60R 21/232 |
| 2023/0382344 A1* | 11/2023 | Cho | ............... | B60R 21/237 |

FOREIGN PATENT DOCUMENTS

| | | | | | |
|---|---|---|---|---|---|
| KR | | 20190044742 | A | * | 5/2019 |
| KR | | 20190127201 | A | * | 5/2019 |
| KR | | 20190045613 | A | * | 6/2019 |
| KR | | 20190068988 | A | * | 11/2019 |
| KR | | 102663181 | B1 | * | 5/2024 |
| WO | WO-2016167530 | A1 | * | 10/2016 | ........... B60R 21/239 |

* cited by examiner

AIRBAG DEVICE FOR VEHICLE

CROSS-REFERENCE TO RELATED APPLICATIONS

This application claims priority to and the benefit of Korean Patent Application No. 10-2022-0185181, filed on Dec. 27, 2022, in the Korean Intellectual Property Office, the disclosure of which is incorporated herein by reference in its entirety.

TECHNICAL FIELD

The present invention relates to a vehicle airbag device, and more specifically, to a vehicle airbag device in which a vent hole is closed using a tether.

BACKGROUND

In general vehicles, airbag devices are installed as safety devices in which cushions receive gas from inflators and inflate to protect passengers when an accident occurs.

Such airbag devices are installed in several portions of a vehicle as necessary, and may be divided into a driver airbag mounted in a steering wheel to protect a driver seated in a driver seat, a front passenger airbag mounted in an upper portion of a glove box to protect a passenger seated in a front passenger seat, curtain airbags mounted along roof rails to protect a side surface of each passenger, or the like.

In the front passenger airbag among such airbag devices, it is important to prevent an injury of the passenger caused by an internal pressure of a cushion.

In recent years, a technology of changing a deployment pressure of a cushion according to a position of a passenger to protect the passenger using an appropriate deployment pressure has been introduced. In particular, since the US motor vehicle safety regulations (FMVSS208) needs to be satisfied to export vehicles to North America, a vent structure, which discharges gas to the outside for a predetermined time and is closed, is added to satisfy the regulations, and various studies thereon are being conducted.

SUMMARY

The present invention is directed to providing a vehicle airbag device in which a development pressure of a cushion is lowered in the case of an abnormal seating state in which a distance between a cushion of an airbag and a position of a passenger is short and a development pressure of the cushion is maintained in the case of a normal seating state in which a distance between the cushion and a position of the passenger is appropriate.

Objectives of the present invention are not limited to the above-described objectives, and other objectives, which are not described above, may be clearly understood by those skilled in the art from the following description.

According to an aspect of the present invention, there is provided a vehicle airbag device including a cushion which includes a chamber inflated by gas and in which vent holes are formed in both side surfaces of the cushion, a vent tube which is disposed in the chamber, into which the gas is introduced, and which is connected to the pair of vent holes to connect the pair of vent holes to each other and guides the introduced gas toward the vent holes, and a tether which is disposed in the chamber and tightens and closes the vent tube as the cushion inflates.

The vent tube may have a pipe-shaped structure in which two end portions are open and may be disposed in the chamber in a direction perpendicular to a development direction in which the cushion develops toward a passenger.

In the vent tube, one end portion may be bonded to one side surface of the cushion along a circumference of the vent hole, and the other end portion may be bonded to the other side surface of the cushion to surround the vent hole along a circumference of the vent hole.

The vent tube may include a tether coupling portion to which the tether is coupled to surround a circumference of the tether coupling portion at a position spaced apart from the end portion of the vent tube, and the tether coupling portion may be provided as a pair of tether coupling portions.

The tether coupling portion may be formed so that the tether surrounds the vent tube along a space formed between a reinforcing fabric and the vent tube in a state in which two edges of the ring-shaped reinforcing fabric added to surround the vent tube are bonded to the vent tube.

The reinforcing fabric may include a slit hole through which the tether passes.

The vent tube may include an inlet hole through which the gas is introduced.

The inlet hole may be provided as a single inlet hole or a plurality of inlet holes.

The inlet hole may be opened so that the gas passes through inlet hole as the chamber inflates and the vent tube develops.

The vent tube may be tightened by the tether and closed in the chamber.

In the tether, one end may be coupled to a circumference of the vent tube, and the other end may be coupled to an inner surface of the cushion.

The tether may be provided as a pair of tethers.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
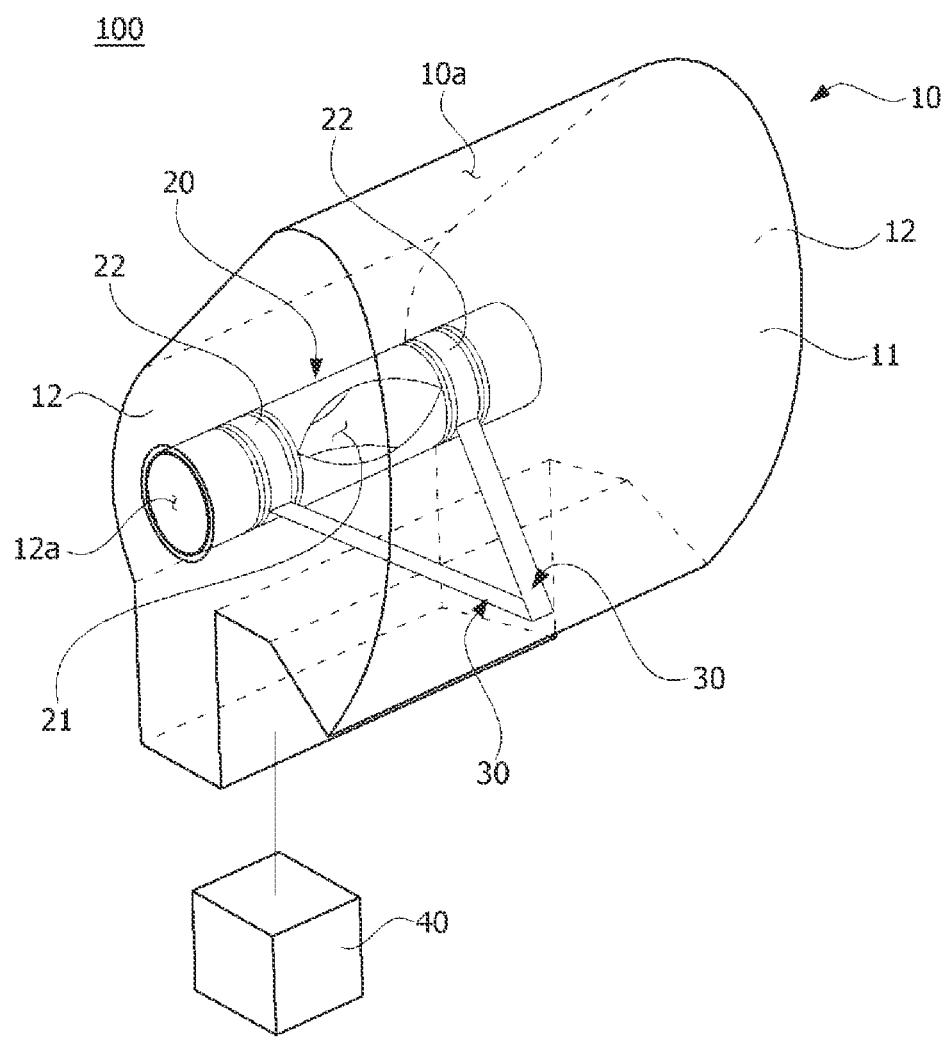
FIG. 1 is a schematic view illustrating a state in which a vehicle airbag device is developed according to an embodiment of the present invention.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, when embodiments are described in detail with reference to the accompanying drawings, components that are the same or correspond to each other will be denoted by the same or corresponding reference numerals in all drawings, and redundant descriptions will be omitted.

Figure 2:
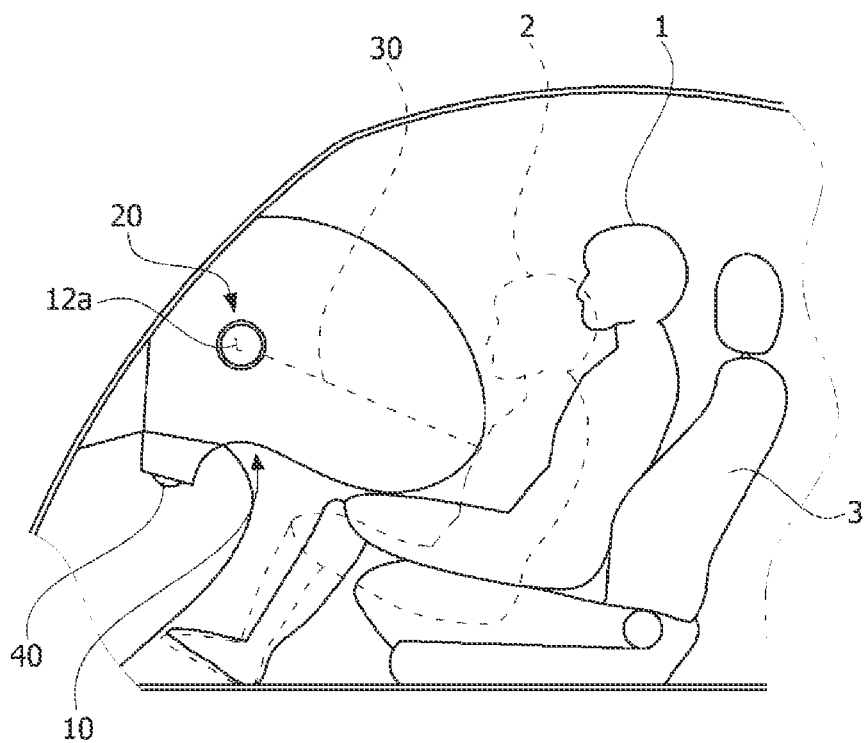
FIG. 2 is a schematic view illustrating distance relationships between an airbag cushion and positions at which a passenger sits.
Figure 3:
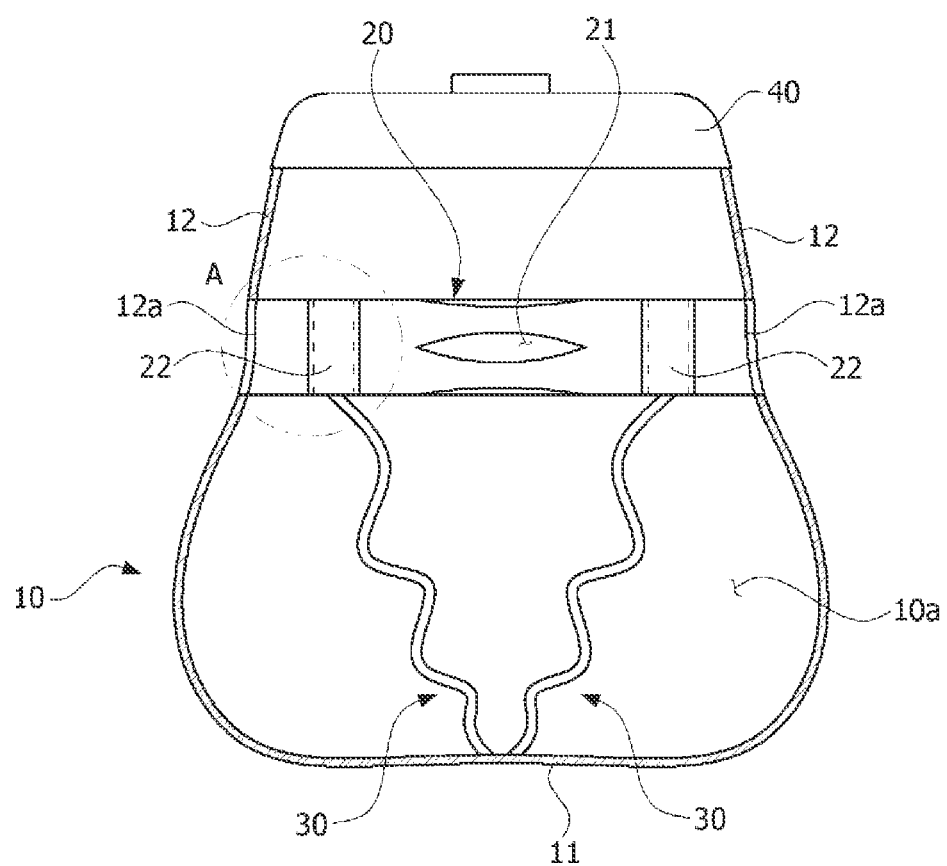
FIG. 3 is a schematic view illustrating a vent tube and a tether in the vehicle airbag device of FIG. 1.
Figure 4:
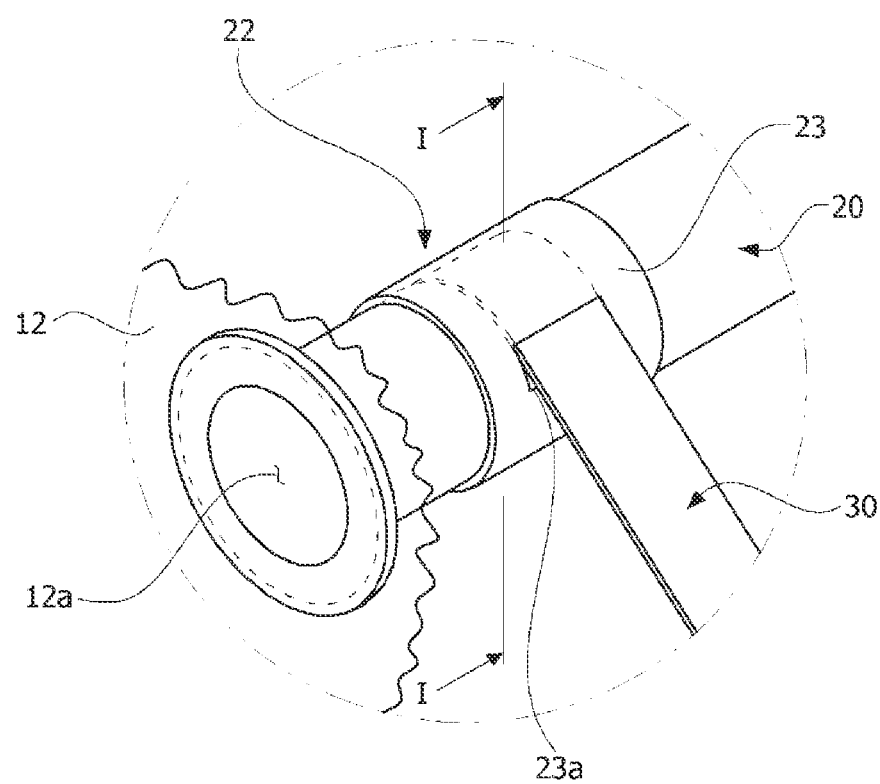
FIG. 4 is an enlarged view illustrating portion A corresponding to a tether coupling portion in FIG. 3.
Figure 5:
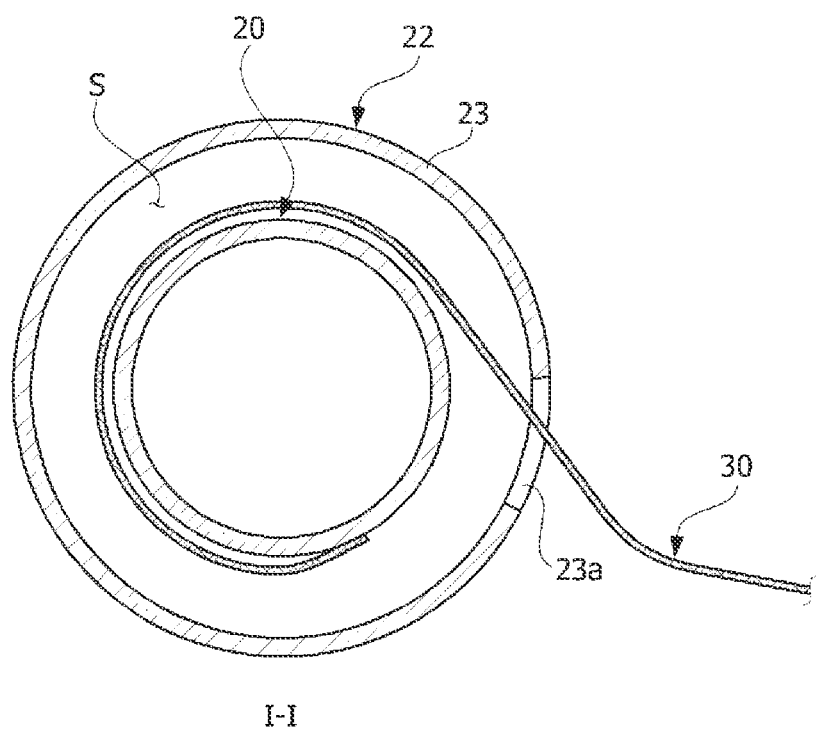
FIG. 5 is a schematic cross-sectional view illustrating portion A along line I-I in FIG. 4.
Figure 6:
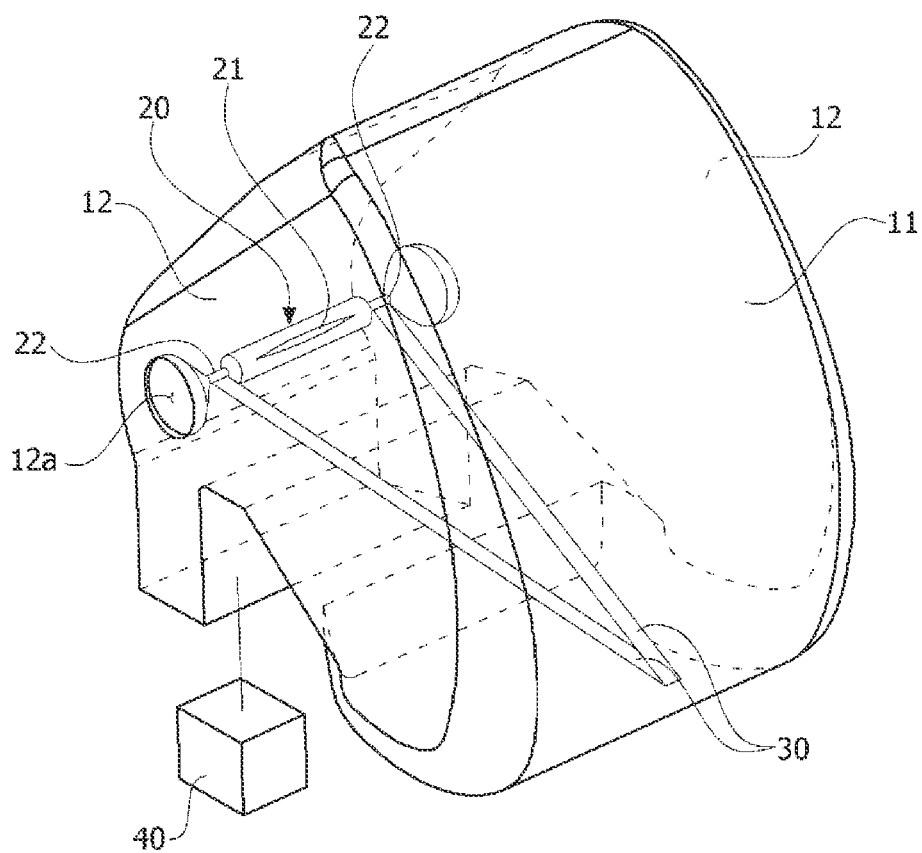
FIG. 6 is a schematic view illustrating a state in which the vehicle airbag device is developed according to the embodiment of the present invention.
Figure 7:
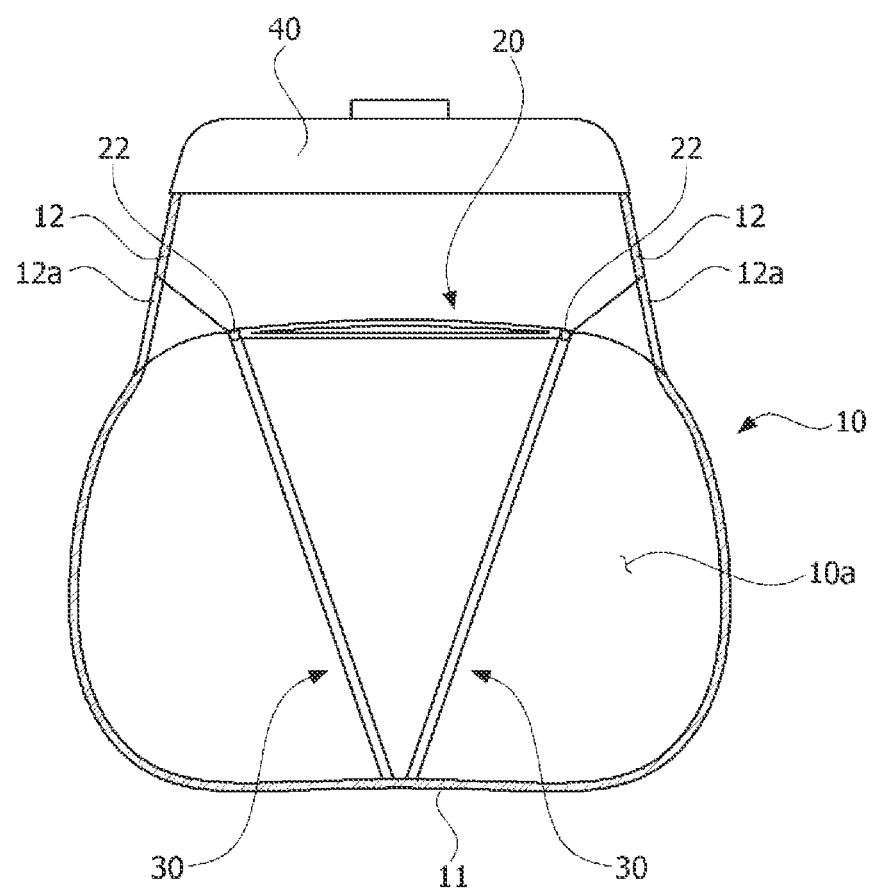
FIG. 7 is a schematic view illustrating the vent tube and the tether in the vehicle airbag device of FIG. 6.

FIG. 1 is a schematic view illustrating a state in which a vehicle airbag device is developed according to an embodiment of the present invention, and FIG. 2 is a schematic view illustrating distance relationships between an airbag cushion and positions at which a passenger sits. FIG. 3 is a schematic view illustrating a vent tube and a tether in the vehicle airbag device of FIG. 1, and FIG. 4 is an enlarged view illustrating portion A corresponding to a tether coupling portion in FIG. 3. FIG. 5 is a schematic cross-sectional view of portion A along line I-I in FIG. 4, and FIG. 6 is a schematic view illustrating a state in which the vehicle airbag device is developed according to the embodiment of the present invention. FIG. 7 is a schematic view illustrating the vent tube and the tether in the vehicle airbag device of FIG. 6.

Referring to the drawings, a vehicle airbag device 100 according to the embodiment of the present invention may include a cushion 10, a vent tube 20, and a tether 30.

The cushion 10 may be connected to an inflator 40 through an opening and configured to protect a passenger sitting in a passenger seat 3 by inflating and developing by gas generated in the inflator 40.

The cushion 10 may include a chamber 10a inflated by the gas, and vent holes 12a may be formed in two side surfaces.

In the embodiment, the cushion 10 may be manufactured of three panels 11 and 12 each formed of a flexible fabric material. As illustrated in the drawings, the cushion 10 may include a main panel 11 which inflates and develops to come into contact with the passenger and side panels 12 which are bonded to two sides of the main panel 11.

The cushion 10 may inflate and develop toward the passenger when a vehicle accident occurs and the gas generated in the inflator 40 enters the cushion 10.

However, as illustrated in FIG. 2, in a case in which the passenger sits in a front portion of a front passenger seat 3 or a case in which the passenger pulls the front passenger seat 3 forward and sits in the front passenger seat 3, when the cushion 10 inflates, since a distance between the passenger sitting in the front passenger seat 3 and the cushion 10 is too short, there is a possibility that the passenger is rather injured by a deployment pressure of the cushion 10.

In FIG. 2, reference numeral "1" indicates that a passenger 1 is at a normal position at which a distance between the cushion 10 and the passenger 1 is an appropriate distance, and the passenger 1 at the position may be protected by an appropriate deployment pressure of the cushion 10.

Reference numeral "2" indicates that a position of a passenger 2 is out of position (OOP) at which a distance between the cushion 10 and the passenger 2 is too short, and there is a possibility that the passenger 2 at the position is rather injured by an excessive deployment pressure of the cushion 10.

As described above, in order to prevent injury due to the excessive deployment pressure of the cushion 10 when a position of the passenger 2 is OOP, in the cushion 10, the vent holes 12a may be formed in the side panels 12 so that the gas introduced into the cushion 10 is partially discharged.

However, in a case which the passenger 1 is at the normal position, when too much gas is discharged through the vent holes 12a in a process of developing the cushion 10, a deployment pressure of the cushion 10 may be rather lowered, and thus there may be a possibility that the passenger 1 at the normal position may not be protected using the appropriate deployment pressure.

Accordingly, in the present embodiment, the vent tube 20 and the tether 30 may be disposed in the chamber 10a of the cushion 10 to adjust a discharge amount of gas of the cushion 10 according to a position of the passenger.

The vent tube 20 may be disposed in the chamber 10a so that the gas is introduced into the vent tube 20. In this case, the vent tube 20 may be disposed in the chamber 10a in a direction perpendicular to a deployment direction in which the cushion 10 develops toward the passenger.

As illustrated in the drawings, the vent tube 20 may have a pipe-shaped structure of which two end portions are open.

The vent tube 20 may include an inlet hole 21 through which gas is introduced. In this case, the inlet hole 21 may be provided as a single inlet hole or a plurality of inlet holes 21.

The inlet hole 21 may be configured to open so that the gas passes through the inlet hole 21 when the chamber 10a inflates and the vent tube 20 develops. Accordingly, the gas supplied into the chamber 10a may be introduced into the vent tube 20 through the inlet hole 21.

In the vent tube 20, one end portion may be bonded to one side surface of the cushion 10 along a circumference of the vent hole 12a, and the other end portion may be bonded to the other side surface of the cushion 10 to surround the vent hole 12a along a circumference of the vent hole 12a. In this case, one side surface and the other side surface of the cushion 10 may correspond to inner surfaces of the side panels 12 facing each other in the chamber 10a.

As described above, two end portions of the vent tube 20 may be connected to the side panels 12 to connect a pair of vent holes 12a so as to guide the introduced gas toward the vent holes 12a. That is, the vent tube 20 may be connected to the vent holes 12a in the chamber 10a to guide the gas toward the vent holes 12a. In addition, the gas may be discharged to the outside of the chamber 10a through the vent holes 12a.

Meanwhile, the vent tube 20 may include a tether coupling portion 22 to which the tether 30 is coupled to surround a circumference of the tether coupling portion 22 at a position spaced inward from an end portion of the vent tube 20. The tether coupling portion 22 may be provided as a pair of tether coupling portions 22.

The vent tube 20 may be tightened and closed in the chamber 10a by the tether 30 at the tether coupling portion 22.

Referring to FIGS. 4 and 5, the tether coupling portion 22 may be formed so that the tether 30 surrounds the vent tube 20 along a space S formed between a reinforcing fabric 23 and the vent tube 20 in a state in which two edges of the ring-shaped reinforcing fabric 23 added to surround the vent tube 20 are bonded to the vent tube 20.

Specifically, the reinforcing fabric 23 is added along a circumference of the vent tube 20 to form the tunnel-shaped space S along the circumference of the vent tube 20, and the tether 30 extends along the space S between the vent tube 20 and the reinforcing fabric 23 to surround the circumference of the vent tube 20.

The reinforcing fabric 23 may include a slit hole 23a through which the tether 30 passes. The tether 30 may enter the space S of the tether coupling portion 22 through the slit hole 23a, and one end of the tether 30 may be coupled to the vent tube 20. The coupling may be performed through a sewing, stitching, bonding, or the like.

The tether 30 disposed in the chamber 10a with the vent tube 20 may be configured to tighten and close the vent tube 20 as the cushion 10 inflates. Accordingly, the gas may be blocked from being discharged to the outside through the vent hole 12a.

The tether 30 may be provided as a pair of tethers 30 to block the gas from being discharged through the vent holes 12a.

As illustrated in the drawings, one end of the tether 30 may be coupled to the circumference of the vent tube 20 at the tether coupling portion 22. In addition, the tether 30 may extend in the chamber 10a so that the other end of the tether 30 is coupled to an inner surface of the cushion 10, that is the main panel 11.

The tether 30 is in a loose state when the cushion 10 is folded, and when the chamber 10a is inflated and developed by the gas, the tether 30 is pulled and tightened by the cushion 10.

As illustrated in FIGS. 6 and 7, the tether 30 tightens the vent tube 20 while tightened as the cushion 10 is developed, and thus the vent tube 20 is tightened and closed by the tether 30. Accordingly, the cushion 10 maintains a deployment pressure without discharging the gas through the vent hole 12a.

In particular, as the tether 30 and the vent tube 20 are disposed in the chamber 10a in the cushion 10, the vent tube 20 is closed in the chamber 10a. Accordingly, when the cushion 10 inflates, the tether 30 is prevented from being interfered with by the passenger or other structures in an interior and from tightening and closing the vent tube 20. In addition, in some cases, a problem that the tether 30 is disconnected without closing the vent tube 20 can be prevented.

As described in the embodiment, since the vent tube 20 connected to the vent hole 12a, through which the gas is discharged, is opened at a beginning stage of deployment of the cushion 10 and closed after the deployment is completed, a discharge amount of gas can be actively adjusted according to a position of the passenger to protect the passenger using an appropriate deployment pressure.

That is, when a position of the passenger 2 is OOP, since the vent tube 20 is opened and the gas introduced along the vent tube 20 is discharged to the outside through the vent hole 12a, even in a case in which a distance between the cushion 10 and the passenger 2 is excessively short, the passenger 2 can be prevented from being injured due to an excessive deployment pressure of the cushion 10.

In addition, when the passenger 1 is at the normal position, since the vent tube 20 is closed and the gas is not discharged to the outside through the vent hole 12a, the cushion 10 can protect the passenger 1 at the normal position while an appropriate deployment pressure is maintained.

In particular, since the vent tube 20 and the tether 30 are not exposed to the outside of the cushion 10 but are disposed in the chamber 10a, the vent tube 20 or the tether 30 can be prevented from being broken or damaged and the passenger can be prevented from being injured due to the tether 30 or the like in a case in which the vent tube 20 or the tether 30 is disposed outside the cushion 10.

According to an embodiment of the present invention, a vehicle airbag device, which discharges gas through a vent hole at a beginning stage of deployment of an airbag and maintains an internal pressure of the airbag by closing the vent hole after the airbag is fully developed, can be provided.

A vehicle airbag device in which a deployment pressure of a cushion is lowered in the case of an abnormal seating state in which a distance between a cushion of an airbag and a position of a passenger is short and a deployment pressure of the cushion is maintained in the case of a normal seating state in which a distance between the cushion and a position of the passenger is appropriate can be provided.

Effects of the present invention are not limited to the above-described effects, and other effects which are not described may be clearly understood by those skilled in the art from the description of the claims.

It will be apparent to those skilled in the art that various modifications can be made to the above-described exemplary embodiments of the present disclosure without departing from the spirit or scope of the invention. Thus, it is intended that the present disclosure covers all such modifications provided they come within the scope of the appended claims and their equivalents.

What is claimed is:

1. A vehicle airbag device comprising:
   a cushion configured to inflate when supplied with a gas to deploy the cushion, the cushion including first and second side surfaces respectively having first and second vent holes;
   a vent tube extending between the first and second vent holes in the cushion, wherein the vent tube includes an inlet hole configured to open as the cushion inflates to guide the supplied gas toward the first and second vent holes while the cushion is inflating;
   a tether disposed in the cushion and configured to tighten and close the vent tube when the cushion inflates, and
   a reinforcing fabric surrounding the vent tube, wherein the tether has a portion sandwiched between the reinforcing fabric and the vent tube,
   wherein:
      the reinforcing fabric includes a slit hole through which the tether extends,
      the reinforcing fabric is spaced apart from the vent tube to create an open space between the reinforcing fabric and the vent tube,
      the tether has a lower surface facing toward the vent tube and an upper surface facing toward the reinforcing fabric, and
      the tether extends through the slit hole in the reinforcing fabric and through the open space into a contact point on the vent tube where the tether is attached to the vent tube such that the upper surface of the tether and the contact point are spaced apart from the reinforcing fabric by the open space.

2. The vehicle airbag device of claim 1, wherein the vent tube is pipe-shaped and extends in a direction perpendicular to a deployment direction of the cushion.

3. The vehicle airbag device of claim 2, wherein the vent tube includes:
   a first end portion coupled to the first vent hole; and
   a second end portion coupled to the second vent hole.

4. The vehicle airbag device of claim 2, wherein:
   the vent tube includes a pair of tether coupling portions disposed away from end portions of the vent tube, and
   the tether is coupled to the pair of tether coupling portions.

5. The vehicle airbag device of claim 1, wherein the inlet hole comprises a plurality of inlet holes.

6. The vehicle airbag device of claim 1, wherein the inlet hole is opened when the cushion inflates such that the gas passes through the inlet hole.

7. The vehicle airbag device of claim 1, wherein the tether comprises:
   a first end coupled to a circumference of the vent tube; and
   a second end coupled to an inner surface of the cushion.

8. The vehicle airbag device of claim 7, wherein the tether comprises a pair of tethers.

9. The vehicle airbag device of claim 1, wherein the tether is attached to a portion of the cushion and configured to tighten and close the vent tube when the tether is extended as the cushion inflates to prevent gas from passing through the first and second vent holes when the cushion has reached a predetermined amount of inflation.

10. The vehicle airbag device of claim 1, wherein the open space is a tunnel-shaped space.

11. A vehicle airbag device for a passenger in a vehicle, comprising:
    a cushion configured to inflate when supplied with a gas to deploy the cushion, the cushion including first and second side surfaces having, respectively, first and second vent holes;
    a vent tube extending between the first and second vent holes in the cushion, wherein the vent tube is configured to guide the supplied gas from an interior of the inflating cushion toward the first and second vent holes while the cushion is inflating;
    a tether disposed in and attached to the cushion and configured to extend to tighten and close the vent tube when the cushion inflates to prevent gas from passing through the first and second vent holes when the cushion has reached a predetermined amount of inflation and the passenger is in a predetermined normal position and
    a reinforcing fabric surrounding the vent tube,
    wherein:
    the tether is configured to only partially close off the vent tube when a front portion of the cushion comes into contact with a passenger who is out of position by being closer to the airbag than the predetermined normal position so that gas continues to partially discharge through the vent holes while the cushion continues to inflate,
    the tether has a portion sandwiched between the reinforcing fabric and the vent tube,
    the reinforcing fabric includes a slit hole through which the tether extends,
    the reinforcing fabric is spaced apart from the vent tube to create an open space between the reinforcing fabric and the vent tube, and
    the tether extends through the slit hole in the reinforcing fabric and through the open space into a contact point on the vent tube where the tether is attached to the vent tube such that an upper surface of the tether and the contact point are spaced apart from the reinforcing fabric by the open space.

12. The vehicle airbag device of claim 11, wherein the vent tube includes an inlet hole which is configured to open as the cushion inflates to guide the supplied gas from an interior of the inflating cushion through the inlet hole into the vent tube and toward the first and second vent holes while the cushion is inflating.

* * * * *